(12) United States Patent
Steudel et al.

(10) Patent No.: US 11,695,907 B2
(45) Date of Patent: Jul. 4, 2023

(54) VIDEO PIPELINE SYSTEM AND METHOD FOR IMPROVED COLOR PERCEPTION

(71) Applicant: MICLEDI MICRODISPLAYS BV, Leuven (BE)

(72) Inventors: Soeren Steudel, Oud-Heverlee (BE); Robbie Thielemans, Nazareth (BE)

(73) Assignee: MICLEDI MICRODISPLAYS BV, Leuven (BE)

( * ) Notice: Subject to any disclaimer, the term of this patent is extended or adjusted under 35 U.S.C. 154(b) by 0 days.

(21) Appl. No.: 17/507,429

(22) Filed: Oct. 21, 2021

(65) Prior Publication Data

US 2022/0150456 A1    May 12, 2022

(30) Foreign Application Priority Data

Nov. 12, 2020   (EP) .................................. 20207126

(51) Int. Cl.
*H04N 9/31*    (2006.01)
*G09G 3/00*    (2006.01)

(52) U.S. Cl.
CPC ........... *H04N 9/3182* (2013.01); *G09G 3/003* (2013.01); *H04N 9/317* (2013.01); *H04N 9/3185* (2013.01); *G09G 2320/0673* (2013.01); *G09G 2340/0435* (2013.01); *G09G 2360/16* (2013.01); *G09G 2370/20* (2013.01)

(58) Field of Classification Search
CPC .... H04N 9/3182; H04N 9/317; H04N 9/3185; H04N 13/324; H04N 5/76; H04N 9/67; H04N 9/77; H04N 13/15; H04N 13/327; H04N 13/332; H04N 13/363; G09G 3/003; G09G 2320/0673; G09G 2340/0435; G09G 2360/16; G09G 2370/20; G09G 2340/06; G09G 2340/10; G09G 2340/125; G09G 5/06; G09G 5/377; G09G 5/026; G09G 2300/023; G02B 2027/0118; G02B 2027/014; G02B 27/017
See application file for complete search history.

(56) References Cited

U.S. PATENT DOCUMENTS 5,721,792 A * 2/1998 Thompson ............. H04N 5/278
                                                358/461
6,317,128 B1 * 11/2001 Harrison ............... G06T 15/503
                                                345/629

(Continued)

FOREIGN PATENT DOCUMENTS

EP       3 705 989 A1    9/2020
WO    2019/215219 A1   11/2019

*Primary Examiner* — Michael Lee
(74) *Attorney, Agent, or Firm* — Ditthavong, Steiner & Mlotkowski

(57) ABSTRACT

A system is provided for facilitating an enhanced video pipeline in order to improve color perception. The system comprises a first source configured to generate a first video stream, a second source configured to generate a second video stream, and a computing device. In this context, the computing device is configured to superpose the first video stream onto the second video stream, thereby generating an output video stream. The computing device is further configured to calculate weighting factors for individual pixels or discrete pixel sets of adjacent individual pixels of the output video stream by analyzing the first video stream and/or the second video stream.

14 Claims, 7 Drawing Sheets

(56) References Cited

U.S. PATENT DOCUMENTS

| | | |
|---|---|---|
| 10,235,779 B2 | 3/2019 | Min et al. |
| 10,378,882 B2 | 8/2019 | Yeoh et al. |
| 2007/0065012 A1* | 3/2007 | Yamakado .............. G06T 11/60 |
| | | 382/176 |
| 2007/0133880 A1 | 6/2007 | Sun et al. |
| 2012/0127198 A1* | 5/2012 | Gundavarapu .......... G09G 5/00 |
| | | 345/629 |
| 2014/0253579 A1 | 9/2014 | Babaguchi |
| 2016/0048220 A1* | 2/2016 | Shen ................. G02B 27/0172 |
| | | 345/8 |
| 2016/0093079 A1* | 3/2016 | Grams .................... G06T 11/60 |
| | | 345/589 |
| 2016/0104302 A1 | 4/2016 | Lee et al. |
| 2016/0155242 A1* | 6/2016 | Bean .................... G06T 15/503 |
| | | 345/592 |
| 2016/0165271 A1* | 6/2016 | Ardo ..................... G06V 10/60 |
| | | 725/32 |
| 2016/0365065 A1 | 12/2016 | Wu et al. |
| 2017/0122725 A1 | 5/2017 | Yeoh et al. |
| 2017/0229099 A1 | 8/2017 | Mito |
| 2018/0012369 A1* | 1/2018 | Lawrence ................. G06T 7/33 |
| 2019/0116353 A1* | 4/2019 | Lodato ................... A61H 5/005 |
| 2020/0043201 A1 | 2/2020 | Tanaka et al. |
| 2021/0158586 A1* | 5/2021 | Castellucci ............. G06T 11/60 |

* cited by examiner

VIDEO PIPELINE SYSTEM AND METHOD FOR IMPROVED COLOR PERCEPTION

PRIORITY

This application claims priority of European Patent Application EP 20 207 126.2 filed on Nov. 12, 2020, which is incorporated by reference herewith.

FIELD OF THE INVENTION

The invention relates to an image and/or real-time video processing system comprising two video sources whereby information of the respective video sources is adapted for improved visual perception. A possible application is augmented reality glasses, whereby a micro-display projects a virtual object through an optical system into the eyes while the real world can still be seen in the background.

BACKGROUND OF THE INVENTION

Color calibration for light-emitting displays is known in the art wherein the colors of light-emitting elements such as LEDs can be dynamically adapted, depending on the content of the video or image to be shown or displayed. This can additionally take into account any non-uniformity of the display, temperature effects and lifetime degradation of said display and the content itself. The color calibration methods known in the art generally define the color points and calibration matrices, and the latter are weighted based on so-called matrix factor defined as a real number between 0 and 1. As a result, the impression is given that much deeper saturated colors can be seen or virtually deeper colors are taken into account for the calibration calculations.

For example, the document WO 2019/215219 A1 shows wireless control and drive of an LED display that can be battery powered, which further includes content dependent calibration. Said calibration is adequate if the image is seen directly (e.g. Television) or projected on a uniform white background (e.g. Cinema). However, if the image is projected or overlaid on a background that is not uniform, the resulting color and brightness perception is not correct anymore, thereby affecting the image quality severely.

Further, we herewith incorporate by reference all subject matter from WO 2019/215219 A1 and EP 3 705 989 A1 in full detail, especially with respect to the mathematical models used in these applications.

Accordingly, there is a need to provide a system and a method for facilitating enhanced video pipeline for improved color perception, especially by using a secondary video source, in order to address the aforementioned limitations.

SUMMARY OF THE INVENTION

According to a first aspect of the invention, a system is provided for facilitating an enhanced video pipeline in order to improve color perception. The system comprises a first source configured to generate a first video stream, a second source configured to generate a second video stream, and a computing device. In this context, the computing device is configured to superpose the first video stream onto the second video stream, thereby generating an output video stream. The computing device is further configured to calculate weighting factors for individual pixels or discrete pixel sets of adjacent individual pixels of the output video stream by analyzing the first video stream and/or the second video stream.

Therefore, the proposed solution presents an enhanced video pipeline that corrects a video stream based on the background parameters, e.g., chromaticity, brightness, reflection, diffusion and so on. For instance, the video pipeline may overlay and may correct the video stream from the first source to be projected or overlaid on a surface or background with a second video stream from the second source to take into account the surface or background parameters.

Preferably, the system further comprises a memory configured to store pre-calculated color manipulation matrices. In this regard, the computing device is further configured to utilize the weighting factors in order to determine the percentage of the pre-calculated color manipulation matrices. The pre-calculated color manipulation matrices correspond to XYZ color spaces according to the International Commission on Illumination (CIE).

The color manipulation matrices or color correction matrices are preferably derived from measurement data that is stored in a non-volatile memory. This measurement data can be multiple sets based on factory measurements using, for example, different viewing angles, current settings or any other parameter that has its influence on the color and brightness perception of a particular display. By means of the weighting factors, the color manipulation matrices are altered in real-time in order to reflect the actual color and brightness perception for each pixel or a cluster of neighboring pixels.

Preferably, the computing device is further configured to estimate influence factors for individual pixels or discrete pixel sets of adjacent individual pixels of the second video stream and further configured to realize the weighting factors as a function of the influence factors. Advantageously, said influence factors address the total influence of the background compared to the foreground, which may vary, for instance, scene by scene or frame by frame.

Preferably, the computing device is further configured to calculate the weighting factors in real-time. Advantageously, the proposed solution provides a real-time computing engine for analyzing the first and/or second video stream, or part of the first and/or second video stream, based on individual pixels or cluster of pixels, thereby yielding said weighting factors.

Preferably, the computing device is further configured to perform Gamma correction on the first video stream and/or the second video stream. In addition, the computing device is further configured to perform in-plane translational and rotational corrections on the first video stream and/or the second video stream. In addition, the computing device is further configured to perform temperature compensation on individual pixels or discrete pixel sets of adjacent individual pixels of the output video stream. Advantageously, any offset between the first video stream and the second video stream is corrected as well as are gamma corrected in order to achieve improved eye perception.

Preferably, the computing device is further configured to perform windowing on the first video stream and/or the second video stream. Said windowing can be implemented on each frame of the video stream to, for instance, reduce the current resolution of a particular frame or stream based on a target resolution. Additionally or alternatively, said windowing can be implemented on a part of a frame such that the resolution of said part is maintained while the resolution in the remaining part is reduced.

Preferably, the system further comprises a surface onto which the first video stream and/or the second video stream and/or the output video stream being projected, and wherein optionally the output video stream is transmitted through an optical waveguide whereby the surface is perceived through the waveguide, preferably a holographic waveguide. Advantageously, the proposed solution facilitates an enhanced video pipeline system that performs real-time positional and content dependent calibration, which can be applied onto any transparent pixel addressed devices.

According to a second aspect of the invention, a method for facilitating an enhanced video pipeline is provided in order to improve color perception. The method comprises a step of generating, by a first source, a first video stream. In addition, the method comprises the step of generating, by a second source, a second video stream. The method further comprises the step of superposing, by a computing device, the first video stream onto the second video stream in order to generate an output video stream. Moreover, the method comprises the step of calculating, by the computing device, weighting factors for individual pixels or discrete pixel sets of adjacent individual pixels of the output video stream by analyzing the first video stream and/or the second video stream.

Therefore, the proposed solution presents an enhanced video pipeline that corrects a video stream by taking into account the background parameters, for instance, chromaticity, brightness, reflection, diffusion and so on.

Preferably, the method further comprises the step of storing pre-calculated color manipulation matrices in a memory. In addition, the method further comprises the step of utilizing the weighting factors in order to determine the percentage of the pre-calculated color manipulation matrices. Further preferably, the method further comprises the step of calculating the weighting factors in real-time.

Advantageously, by means of the weighting factors that especially take into account the background influences, the color manipulation matrices are altered in real-time in order to reflect the actual color and brightness perception for each pixel or a cluster of neighboring pixels.

Preferably, the method further comprises the step of storing the output video stream in an on-chip memory in order to access the output video stream at a frame rate different from the first source. Further preferably, the method comprises the step of performing a late stage re-projection function depending on an input of an external data source tracking a viewer position and/or movement and/or eye viewing angle.

Advantageously, the final data stream is stored in an on-chip memory, e.g. SRAM, so that, for instance, the display driver can access the video data at a frame rate different from the first video source. The late stage re-projection further allows image and pixel adjustments depending on the input of an external data source that tracks the viewer position, movement or viewing angle.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Reference will now be made in detail to the embodiments of the present invention, examples of which are illustrated in the accompanying drawings. However, the following embodiments of the present invention may be variously modified and the range of the present invention is not limited by the following embodiments.

Figure 1:
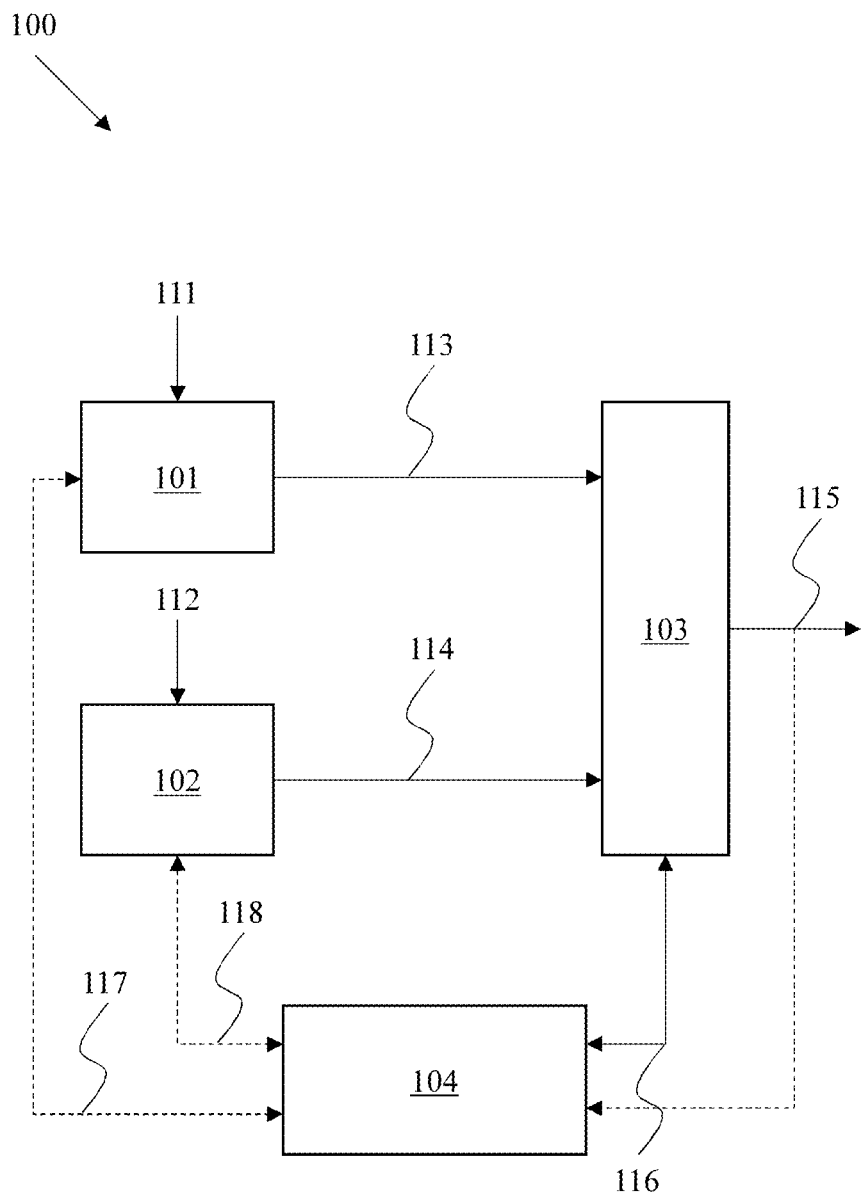
FIG. 1 shows a first exemplary embodiment of the system according to the first aspect of the invention.

In FIG. 1, a first exemplary embodiment of the system 100 according to the first aspect of the invention is illustrated. The system 100 comprises a first source or a first video source 101 that generates a first video stream 113 in a defined or particular format. For instance, the first source 101 can be a display die, e.g., an LED display die or RGB LED display dies, which displays video via RGB input. In this regard, the input can be sent from a local or an external source 111, for instance. The system 100 further comprises a second source or a second video source 102 that generates a second video stream 114 in a defined or particular format. For instance, the second source 102 can be a camera, where the video stream can be originated from the camera via RGB input. Alternately, the second source 102 can be a display die, e.g., an LED display die or RGB LED display dies, which displays video via RGB input, and the input can be sent from a local or an external source 112.

Moreover, the system 100 comprises a computing device 103 that superposes the first video stream 113 onto the second video source 114, or vice versa, in order to generate an output video stream 115. In this regard, the computing device 103 analyzes the first video stream 113 and/or the second video stream 114, or a part of first video stream 113 and/or a part of the second video stream 114, based upon individual pixels or clusters of pixels in case of data reduction, herewith yielding weighting factors. Such weighting factors can be, for example weighting for brightness of colors to be emitted or perceived. The computing device 103 can be implemented with custom electronics, FPGA, microcontroller, processor, and the like, so as to facilitate a real-time computation engine.

The system 100 further comprises a memory 104 that primarily stores the pre-calculated manipulation or calibration matrices. The memory 104 can be further configured to act as a local source and/or storage of the video data 117 for the first source 101 and to act as a local source and/or storage of the video data 118 for the second source 102. The memory 104 can be further configured to store the output video stream 115. The memory 104 may further comprises processing commands and/or instructions to execute within the computing device 103 and is able to communicate with the computing device 103 by exchanging control signals 116. The system 100 may further comprise additional memory dedicated to, for instance the first video stream 113 and/or the second video stream 114 and/or the output video stream 115. Said additional memory is preferably an on-chip memory, for instance a static random access memory.

Figure 2:
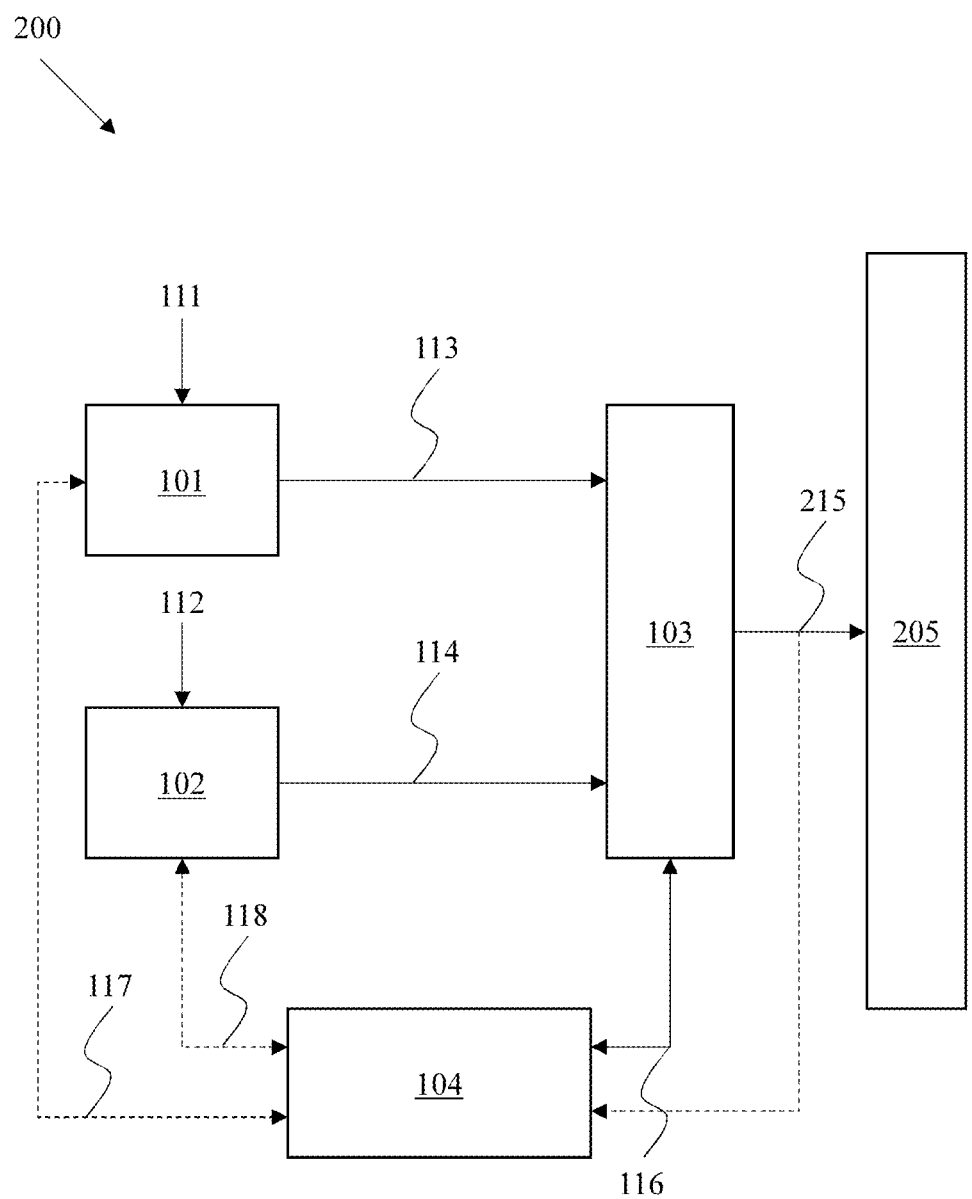
FIG. 2 shows a second exemplary embodiment of the system according to the first aspect of the invention.

In FIG. 2, a second exemplary embodiment of the system 200 according to the first aspect of the invention is illustrated. The system 200 differs from the system 100 of FIG. 1 in that the system 200 additionally comprises a surface 205, where the computing device 103 may project a video stream 215 to be displayed onto the surface 215. Said video stream 215 may comprise the first video stream 113 and/or the second video stream 114 and/or the superposed first video stream 113 onto the second video stream 114, i.e. the output video stream 115. Additionally or alternatively, the superposed first video stream 113 onto the second video stream 114, i.e. the output video stream 115 may be transmitted through an optical waveguide (not shown), e.g. a holographic optical waveguide, where the surface 205 can be perceived through the waveguide.

Therefore, it can be understood that the system 200 resembles an augmented reality system or goggle, where the surface 205 can be interpreted as the glasses of the goggle. The second source 102 can be interpreted as a camera that is mounted onto the goggle, which acts as the secondary or auxiliary information channel. The first source 101 acts as the primary information channel that contains the information to be shown of displayed onto the glasses of the goggle itself. Preferably, the information is originated from a local or an external data source.

Hence, the system 200 describes a generic real-time video processing system capable of performing real-time pixel color adjustment based upon criteria that are related to primary information to display from the first video stream 113 and/or the auxiliary information from the second video stream 114. In this regard, the second video stream 114 does not necessarily need to be linked to the channel of primary information to be displayed.

Figure 3:
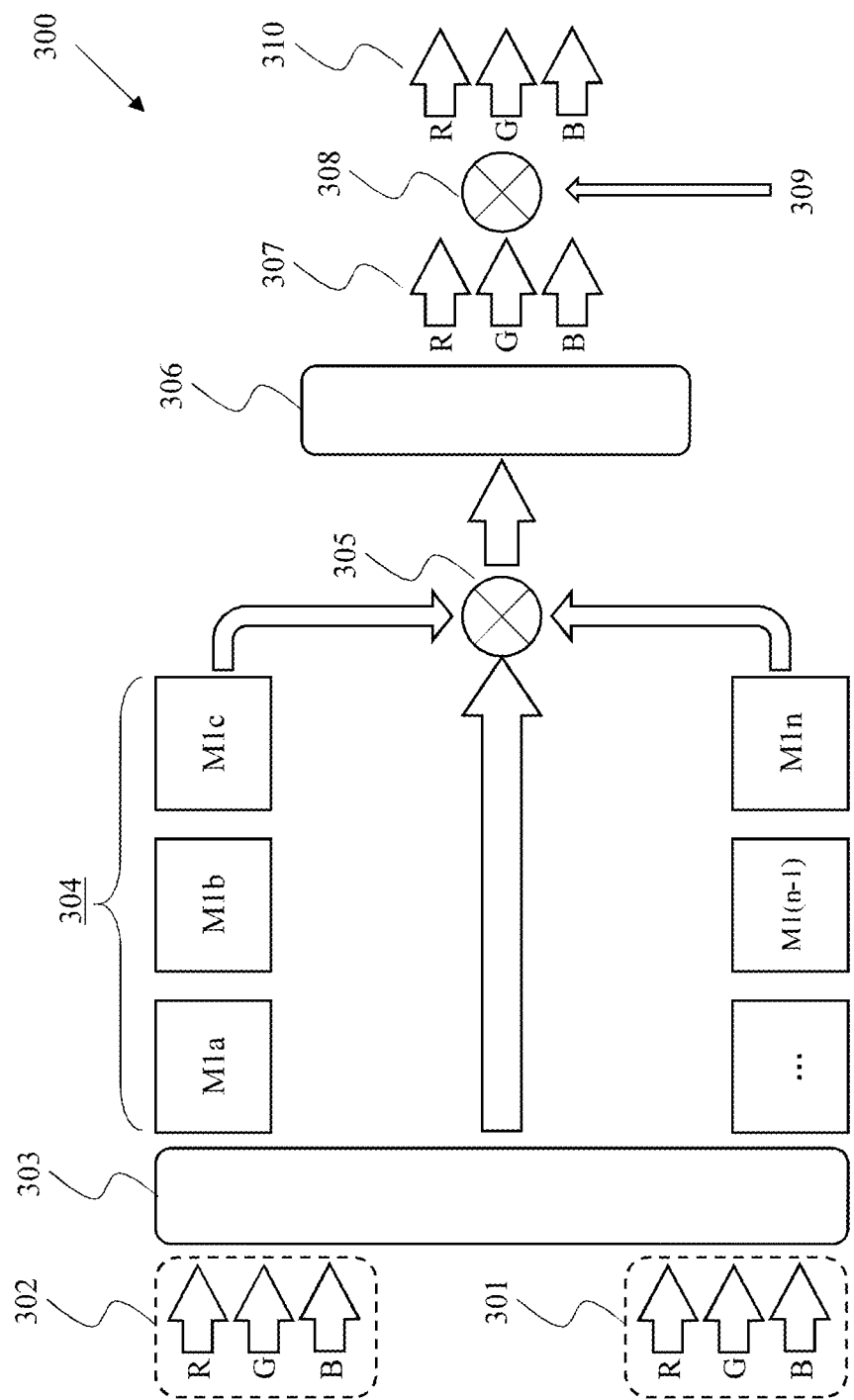
FIG. 3 shows an exemplary process flow diagram of the enhanced video pipeline according to the first aspect of the invention.

In FIG. 3, an exemplary process flow diagram of the enhanced video pipeline 300 according to the first aspect of the invention is illustrated. The RGB input 301 represents the RGB input of the primary information channel and the RGB input 302 represents the RGB input of the secondary or auxiliary information channel. The primary information channel may correspond to the first source 101 and the auxiliary information channel may correspond to the second source 102. Alternately, the primary information channel may correspond to the second source 102 and the auxiliary information channel may correspond to the first source 101. Generally, the execution of the first source 101 and the second source 102 as the primary channel or the secondary channel depends on the application onto which the video pipeline 300 to be executed.

Preferably, the primary RGB input 301 and/or the auxiliary RGB input 302 is geometrically corrected, i.e., X-Y translation and rotational offset corrections. It is further preferable that the primary RGB input 301 and/or the auxiliary RGB input 302 is Gamma corrected.

The primary RGB input 301 and the auxiliary RGB input are fed to a factor engine 303 that determines weighting factors A, B, C, . . . , N, based upon individual pixels or a cluster of neighboring pixels, in order to determine the amount of percentage of the pre-calculated color correction or manipulation matrices $M1a, M1b, M1c, \ldots, M1n$. The matrices $M1a, M1b, M1c, \ldots, M1n$ are basically to be used for the calibration with a,b,c, . . . , n being an integer number. The matrices $M1a, M1b, M1c, \ldots, M1n$ can reside in the memory 104 or the computing device 103 may derive the matrices $M1a, M1b, M1c, \ldots, M1n$ in real-time from their original format.

In the next consecutive processes, weighting factor multiplication 305 and final matrix calculation 306 are performed such that:

$$A \times M1a + B \times M1b + C \times M1c + \ldots + N \times M1n = Mfinal$$

Where, Mfinal denotes the final matrix, i.e., the output RGB stream to be displayed. Additionally, generic pixel level corrections 309, for instance temperature compensation, are implemented onto the output RGB stream.

It is to be noted that, the secondary video stream does not necessarily need to have the same resolution, nor the same frame rate in relation to the primary video stream. In case the resolution is lower, the readout is adapted by the computing device 103 (e.g. windowing by using an interpolation filter) to reflect the position of the particular pixel to be processed in the primary video stream. In case of a different frame rate, data from previous or current frame can be used. Alternatively, frame rate conversion, (scan conversion) and resolution scaling, rotation or any geometric correction on either primary or secondary channel are performed by the computing device 103 as well such that both video streams have the same prior to be used in the enhanced video pipeline 300.

The system 100 or 200 may comprise an additional memory dedicated to the primary channel and/or the auxiliary channel. For instance, in the case both primary channel and auxiliary channel have a memory that contains the previous image, the computing device 103 may perform a comparison between the individual pixels in said images. If for a certain pixel in the image both secondary channel as well as primary channel have the same data, then the computing device 103 refrains from any further computation and utilizes the previous result from the previous frame calculation. This technique significantly reduces the overall computation time.

In the case the first source 101 and/or the second source 102 is implemented as LED display, the light output of LEDs is susceptible to temperature variations. Hence the video pipeline 300 comprises an extra multiplier 308 at the end to compensate for these variations, whereby the multiplication factor is updated in certain relevant intervals. Alternatively, the temperature variation compensation can also be included by modifying the individual matrix elements, e.g. by the factor engine 303, in the proposed video pipeline 300 instead of multiplying it afterwards.

The matrices $M1a, M1b, M1c, \ldots, M1n$ are ideally derived from measurement data, which can be multiple sets based on factory measurements using different viewing angles, current settings or any other parameter that has its influence on the color and brightness perception of a particular display. Given the current information on these parameters, the computing device 103 is configured to compute and alter the correction or calibration matrices $M1a, M1b, M1c, \ldots, M1n$ in real-time in order to reflect the changes based on the measurement sets.

Figure 4:
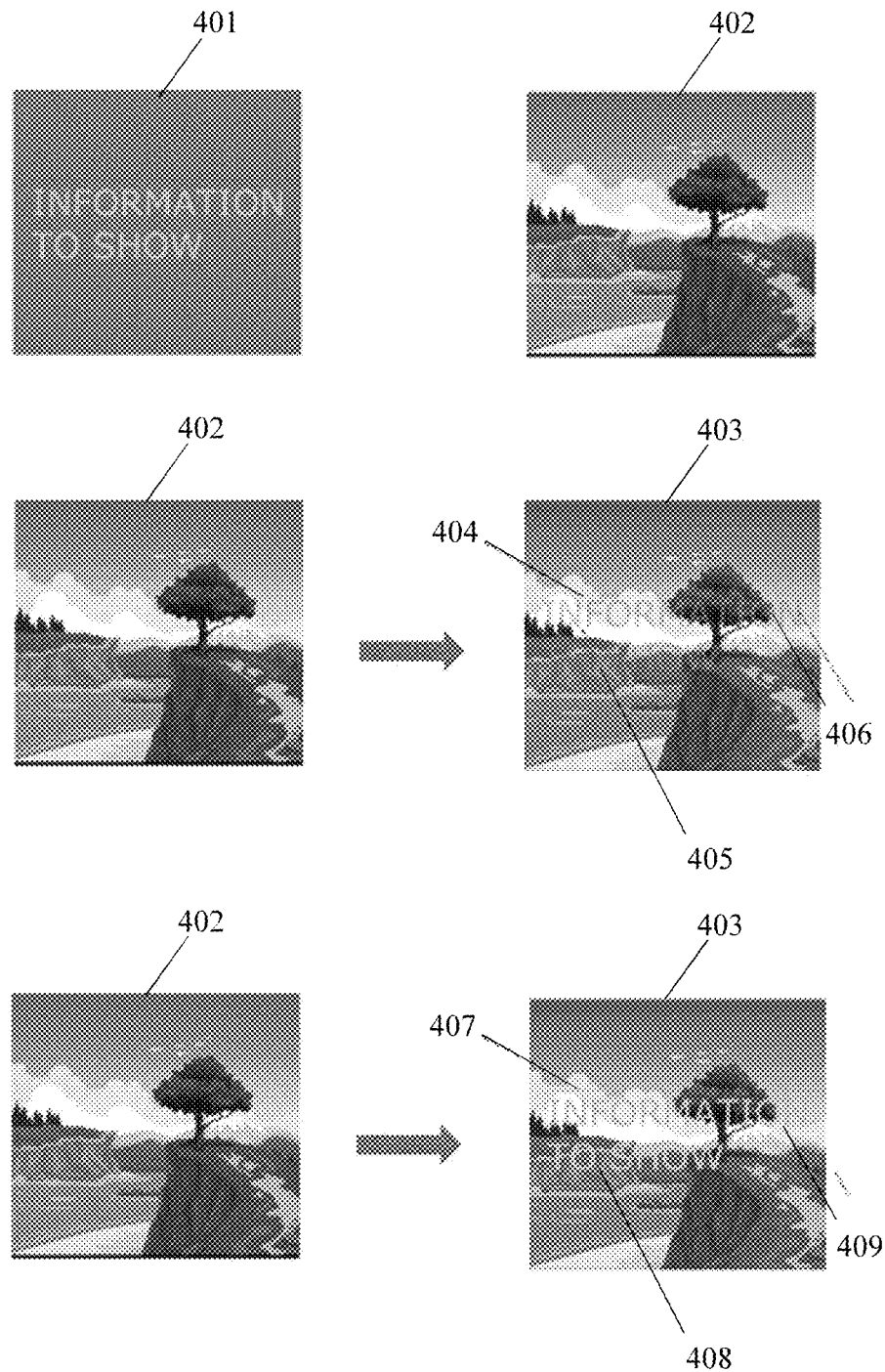
FIG. 4 shows a first exemplary implementation of the enhanced video pipeline according to the first aspect of the invention.

In FIG. 4, a first exemplary implementation of the enhanced video pipeline 300 according to the first aspect of the invention is illustrated. Herein, the image 401 represents the information from the primary channel and the image 402 represents the information from the auxiliary channel, where the image 401 is to be superposed onto the image 402. In view of the system 200 shown in FIG. 2, the image 402 can be interpreted as the background seen by the camera and the image 401 can be interpreted as the foreground image or information to be shown on the goggle. The image 403 represents the superposed output of the images 401 and 402.

From the pixel points 404,405,406 of the image 403, it can be seen that the superposing or overlaying results in a detrition of color for the image 401. Depending on the color in the background, i.e., image 402, the computing device 103 performs more or less emphasis toward more or less saturation. The computing device 103 may define, for instance, three matrices, one each respectively for red, green and blue as standard matrices to be used when the background color is white. In addition, the computing device 103 may use a fourth matrix for white on top of those three. In case background color is blue, another set of matrices is to be defined and the same is valid when background is red or green. Once the pixel color of the background is analyzed and represented by a matrix, the computing device 103 determines the correction factors and implements in real-time parametric logic. The final color correction matrix is computed and the altered color is shown.

The computing device 103 preferably performs background extraction wherein the brightness to show (being the matrix numbers) for a particular pixel is derived from subtraction of the background from the desired (foreground) pixel. The finally displayed pixel is then the residual value as the background already contains part of the (color brightness) information that is to be shown. Therefore, the correction factor in this case simple becomes a measure of the difference between background and foreground images.

From the pixel points 407,408,409 of the image 403, it can be seen that the implementation of the proposed enhanced video pipeline 300 drastically improves the color perception. For instance, at the pixel point 409, if the background already provides sufficient green, at the same pixel point of the foreground image the green color is reduced, thereby improving the color perception of the superposed image 403.

Alternatively, the computing device may use the auxiliary channel, e.g. camera, to see both foreground and background and can then perform analysis. In other words, now, the camera not only views the background, but also shows the image that is to be displayed, whereas the camera is now mounted in front of the goggle glasses (from the perspective of someone wearing such goggles). Of course, this has an influence on how the matrices need to be build and precomputed, but outcome can be exactly the same as when the camera is mounted behind of or next to the goggle glasses (again from the perspective of someone wearing such goggles).

Figure 5:
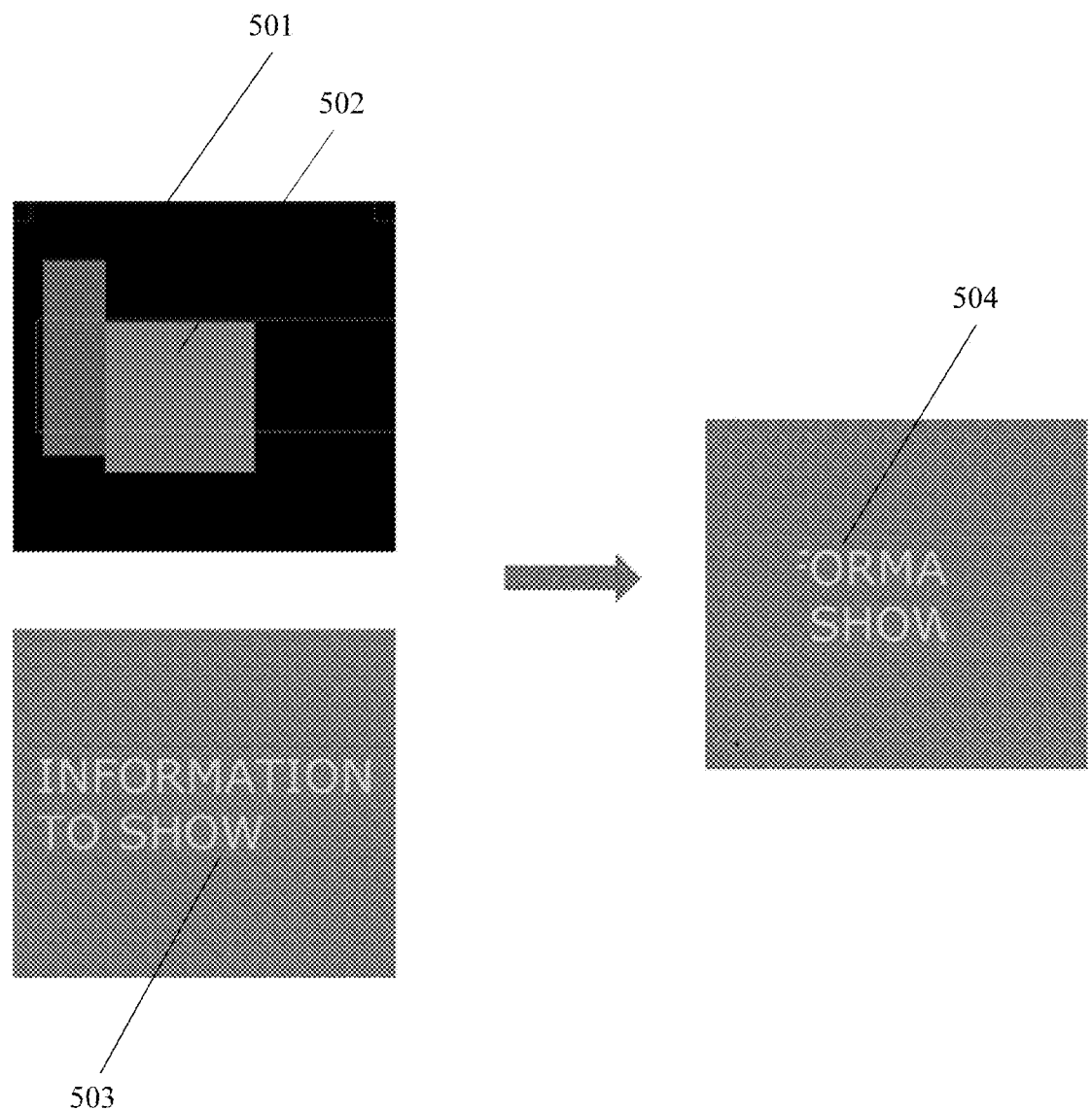
FIG. 5 shows a second exemplary implementation of the enhanced video pipeline according to the first aspect of the invention.

In FIG. 5, a second exemplary implementation of the enhanced video pipeline 300 according to the first aspect of the invention is illustrated. Herein, the background 501 is used as color key, for instance as a green screen keying known in the art. The information to be shown 503 will only be shown if the background 501 has certain values of green 502. The resulting image is shown in the right 504.

It is to be noted that the illustrated color keying can be implemented for all kinds of colors, ranges and even discontinuous color ranges. Further, the green screen background 502 is here the only location where primary information 503 from e.g. a data source channel is to be shown or with which it can be combined.

Figure 6A:
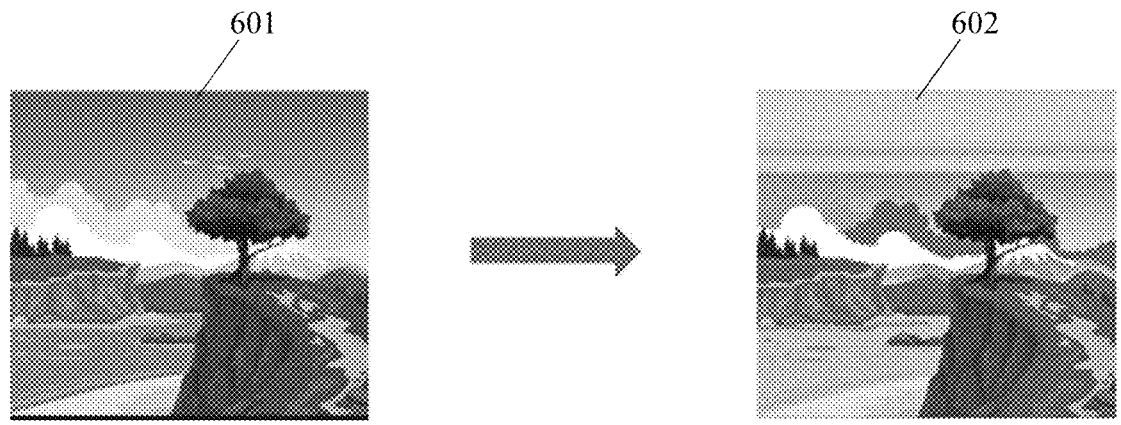
FIG. 6A shows a third exemplary implementation of the enhanced video pipeline according to the first aspect of the invention.

In FIG. 6A, a third exemplary implementation of the enhanced video pipeline 300 according to the first aspect of the invention is illustrated. The image 601 represents the inputted image, either from a local or from an external data source, and the image 602 represents the manipulated image. This example particularly refers to visual aid for visibly impaired people. For this particular application, only the secondary information channel is used for real-time image processing. For example, in case one cannot see blue very well, these colors can be real-time adapted to for example more reddish and yellow shades.

Figure 6B:
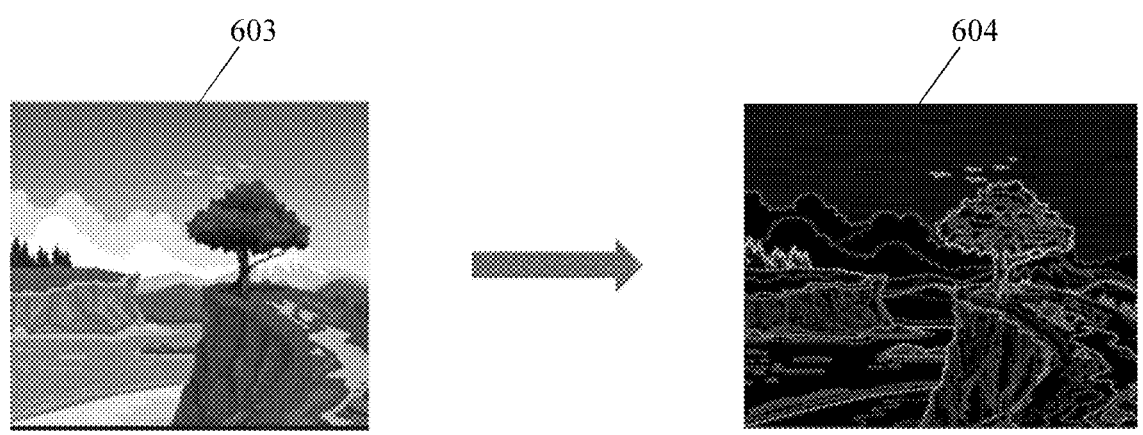
FIG. 6B shows a fourth exemplary implementation of the enhanced video pipeline according to the first aspect of the invention.

In FIG. 6B, a fourth exemplary implementation of the enhanced video pipeline 300 according to the first aspect of the invention is illustrated. The image 603 represents the inputted image, either from a local or from an external data source, and the image 604 represents the manipulated image. The example generally illustrates a rudimentary edge detection scheme. Here, it is needed to make use of clusters of pixels (rather than just individual pixels) in order to perform rudimentary edge detection, while using only the secondary information channel. In this particular case, the weighing factors A, B, C, . . . , N for a particular cluster are remembered for the next cluster and thus a limited set of factors is added or recalculated.

In the following, the traditional color calibration and the proposed content dependent color calibration concepts are explained in detail in view of the CIE 1931 color space.

The RGB LEDs of a display die are needed to be measured at a defined current and defined temperature. This measurement can be performed with e.g. a spectrometer. This yields chromaticity x,y and luminance Y measurement values for every of the R, G and B colors in one LED. The x,y,Y values are converted to X,Y,Z for working in linear space. For instance, the measurements can be expressed as:

$Rin = (Rinx, Riny, RinY) = (RinX, RinY, RinZ)$ $Gin = (Ginx, Giny, GinY) = (GinX, GinY, GinZ)$ $Bin = (Binx, Biny, BinY) = (BinX, BinY, BinZ)$ Color conversions are performed using following formulas:

$$x = \frac{X}{X+Y+Z} \tag{1a}$$

$$y = \frac{Y}{X+Y+Z} \tag{1b}$$

$$z = \frac{Z}{X+Y+Z} = 1 - x - y \tag{1c}$$

$$X = Y\frac{x}{y} \tag{1d}$$

$$Z = \frac{Y}{y}(1 - x - y) \tag{1e}$$

The LEDs are now calibrated to target colors to be displayed, which are defined by specific standards, for example, NTSC, Adobe RGB, PAL, and so on. For instance, the target red color can be defined as:

$Rtarg = (Rtargx, Rtargy, RtargY) = (RtargX, RtargY, RtargZ)$

The linear relationship can be extended for all colors, such as:

$RtargX = RinX \times RonR + GinX \times GonR + BinX \times BonR$ $RtargY = RinY \times RonR + GinY \times GonR + BinY \times BonR$ $RtargZ = RinZ \times RonR + GinZ \times GonR + BinZ \times BonR$ Where, RonR means how much contribution of Red from the native LED needs to use in the desired (target) color of red. GonR mean how much green of the original LED color needs to be added to this red and so on. Alternatively, in the following matrix form:

$$\begin{bmatrix} RinX & GinX & BinX \\ RinY & GinY & BinY \\ RinZ & GinZ & BinZ \end{bmatrix} \times \begin{bmatrix} RonR \\ GonR \\ BonR \end{bmatrix} = \begin{bmatrix} RtargX \\ RtargY \\ RtargZ \end{bmatrix} \quad (2)$$

Performing this for also Green and blue yield following Matrix formula:

$$\begin{bmatrix} RinX & GinX & BinX \\ RinY & GinY & BinY \\ RinZ & GinZ & BinZ \end{bmatrix} \times \begin{bmatrix} RonR & RonG & RonB \\ GonR & GonG & GonB \\ BonR & BonG & BonB \end{bmatrix} = \quad (3)$$

$$\begin{bmatrix} RtargX & GtargX & BtargX \\ RtargY & GtargY & BtargY \\ RtargZ & GtargZ & BtargZ \end{bmatrix}$$

Since the input is known and targets are known, the equation (3) can be solved for the RonR etc. such as:

$$\begin{bmatrix} RonR & RonG & RonB \\ GonR & GonG & GonB \\ BonR & BonG & BonB \end{bmatrix} = \quad (4)$$

$$\begin{bmatrix} RinX & GinX & BinX \\ RinY & GinY & BinY \\ RinZ & GinZ & BinZ \end{bmatrix}^{-1} \times \begin{bmatrix} RtargX & GtargX & BtargX \\ RtargY & GtargY & BtargY \\ RtargZ & GtargZ & BtargZ \end{bmatrix}$$

It is to be noted that the brightness Y is normalized for all the targets to 1. Due to this, additional information can be added to not only set the LED calibrated colors to a target color, but to use the brightness of each individual target color to set the display to a fixed white point when all RGB colors are on. For instance, the following matrix:

$$\begin{bmatrix} RX & GX & BX \\ RY & GY & BY \\ RZ & GZ & BZ \end{bmatrix} \times \begin{bmatrix} R \\ G \\ B \end{bmatrix} = \begin{bmatrix} WX \\ WY \\ WZ \end{bmatrix} \quad (5)$$

where, WX, WY, WZ is the white point. The RX, GX, . . . is in this case the target color matrix as these target colors and the brightness of the targets are required to get to the right white point. Therefore, the equation (5) needs to be solved for RGB.

$$\begin{bmatrix} R \\ G \\ B \end{bmatrix} = \begin{bmatrix} RX & GX & BX \\ RY & GY & BY \\ RZ & GZ & BZ \end{bmatrix}^{-1} \times \begin{bmatrix} WX \\ WY \\ WZ \end{bmatrix} \quad (6)$$

It is to be noted that color perception of the human eye is most sensitive in x direction and less in y direction. However, when luminance of colors is varied, it is proven that the human eye color perception changes. Furthermore, with respect to resolution, or in other words, how humans perceive the sharpness of a picture or image, this is the most sensitive in the red component. The least sensitive is the blue component. Best example to show this is to read a blue text in a black background. This is much more difficult compared to reading a red text on a black background. Moreover, the human eye is also not sensitive to gradual luminance variations. Best example is e.g. a projector or beamer. The measured brightness in the corners is only 25% compared to the brightness in the center (100%). Humans will perceive this as uniform. Immediate differences in brightness will be perceived much faster (within tolerance limits).

Therefore, for calibration purposes, that in the case where blue batches of colors need to be calibrated, brightness variations will yield much better perceived uniformity. Hence, LEDs that need this blue brightness variation will need a different matrix. Thus the need of two matrices. However, varying brightness of a target color has the effect that (when used with also R and G) the white point changes. As a result, the LEDs that need blue calibration by changing its blue brightness will give a very different white point. It is obvious that this is certainly not desirable, and therefore, the solution exists in using a factor that is content dependent. This factor will define when to use the Blue matrix or the normal matrix.

Furthermore, the matrices (due to variations in LEDs) are different for every individual RGB LED. The example below is explained using one LED.

For instance, one matrix can be defined that is to be used when only blue needs to be shown (MBonly) and one matrix when blue is used whilst also showing green and red (MBmix). The matrices are derived in the same manner as shown in the equations 1-6.

Here, MBonly needs to be used for 100% when the content to be shown is only blue and MBmix needs to be used for 100% when there is a substantial mix of red and green. Hence, the final matrix to be used is:

$$M\text{final} = \text{Factor} \times MB\text{mix} + (1 - \text{Factor}) MB\text{only} \quad (7)$$

When Factor=1, Mfinal=Mbmix
When factor=0, Mfinal=Mbonly.

Next, a formula for weighting factors can be defined that takes the above assumptions into account and that can also be implemented in real time:

$$\text{Factor} = \max\left(2 \times \frac{R+G}{R+G+B}; 1\right) \quad (8)$$

Factor=0 when there is only blue to be shown,
0<Factor <1 when blue has a minor involvement in the content to be shown,
Factor >=1 (clipped) when blue is substantial mix of colors.

The following example relates to the scenario when only the information of the auxiliary channel is used.

In an embodiment for compensating for a background, following method can be applied. It is to be noted that, only for the sake of simplicity, it is assumed that the Red, Green and Blue colors have the same Chrominance as the colors of the LEDs. For the persons skilled in the art, it is obvious to incorporate the above steps, i.e. the techniques according to equations (1) to (8). However, in order to avoid unnecessary complexity, the above-described steps are omitted in the following example for the sake of explanation. In this example for easier factor deriving, the calibration matrix is split in three parts such as:

$$\begin{bmatrix} RonR & RonG & RonB \\ GonR & GonG & GonB \\ BonR & BonG & BonB \end{bmatrix} = A \begin{bmatrix} RonR & RonG & RonB \\ 0 & 0 & 0 \\ 0 & 0 & 0 \end{bmatrix} + \quad (9)$$

$$B \begin{bmatrix} 0 & 0 & 0 \\ GonR & GonG & GonB \\ 0 & 0 & 0 \end{bmatrix} + C \begin{bmatrix} 0 & 0 & 0 \\ 0 & 0 & 0 \\ BonR & BonG & BonB \end{bmatrix}$$

In this case, the factors A, B and C are NOT derived from the primary channel, but instead derived from the auxiliary channel. For this example, brightness emitted from the LEDs is compensated with the background information to get as close as possible to the intended color.

A natural perfect background can be defined as:

$$RGBback = (Rn, Bn, Gn) \quad (10)$$

where, Rn, Bn, Gn numbers are normalized to values between 0 and 1. This natural background can be chosen arbitrarily and is meant to set a reference. At this reference, colors to be displayed are not needed to be changed. Hence, by assuming the background equals Rn, Gn, Bn; the color to be displayed must remain untouched.

Another assumption in this example is to assign a background influence factor (Bif). This background influence factor sets the total influence of the background compared to the foreground. The background influence factor can be set as a percentage, e.g. 10%, which physically means that the foreground (i.e. the real picture to show) is 10 times brighter compared to the background. It is to be noted that the background influence factor may vary scene by scene or even frame by frame due to, for instance the presence of an Automatic gain control in cameras.

For instance, if the target color is given by:

$$(Rn + \Delta r; Gn + \Delta g; Bn + \Delta b)$$

where, $\Delta r$, $\Delta g$ and $\Delta b$ can both be negative or positive. They can be expressed as follows:

$$\Delta r = Rprimary - Rauxiliary \times Bif - Rauxiliary, ref \quad (11a)$$

$$\Delta g = Gprimary - Gauxiliary \times Bif - Gauxiliary, ref \quad (11b)$$

$$\Delta b = Bprimary - Bauxiliary \times Bif - Bauxiliary, ref \quad (11c)$$

If $\Delta r$ is positive, Red is needed to be emphasized. If $\Delta r$ is negative, then the red in the background is abundant. If $\Delta r$, $\Delta g$, $\Delta b$ are all positive, this means only a slight color boost is needed. The final factors from equation (11) in this example:

$$A = \Delta r \quad (12a)$$

$$B = \Delta g \quad (12b)$$

$$C = \Delta b \quad (12c)$$

The final matrix Mfinal can be realized as:

$$Mfinal = \begin{bmatrix} RonR & RonG & RonB \\ GonR & GonG & GonB \\ BonR & BonG & BonB \end{bmatrix} = \Delta r \begin{bmatrix} RonR & RonG & RonB \\ 0 & 0 & 0 \\ 0 & 0 & 0 \end{bmatrix} + \quad (13)$$

$$\Delta g \begin{bmatrix} 0 & 0 & 0 \\ GonR & GonG & GonB \\ 0 & 0 & 0 \end{bmatrix} + \Delta b \begin{bmatrix} 0 & 0 & 0 \\ 0 & 0 & 0 \\ BonR & BonG & BonB \end{bmatrix}$$

Figure 7:
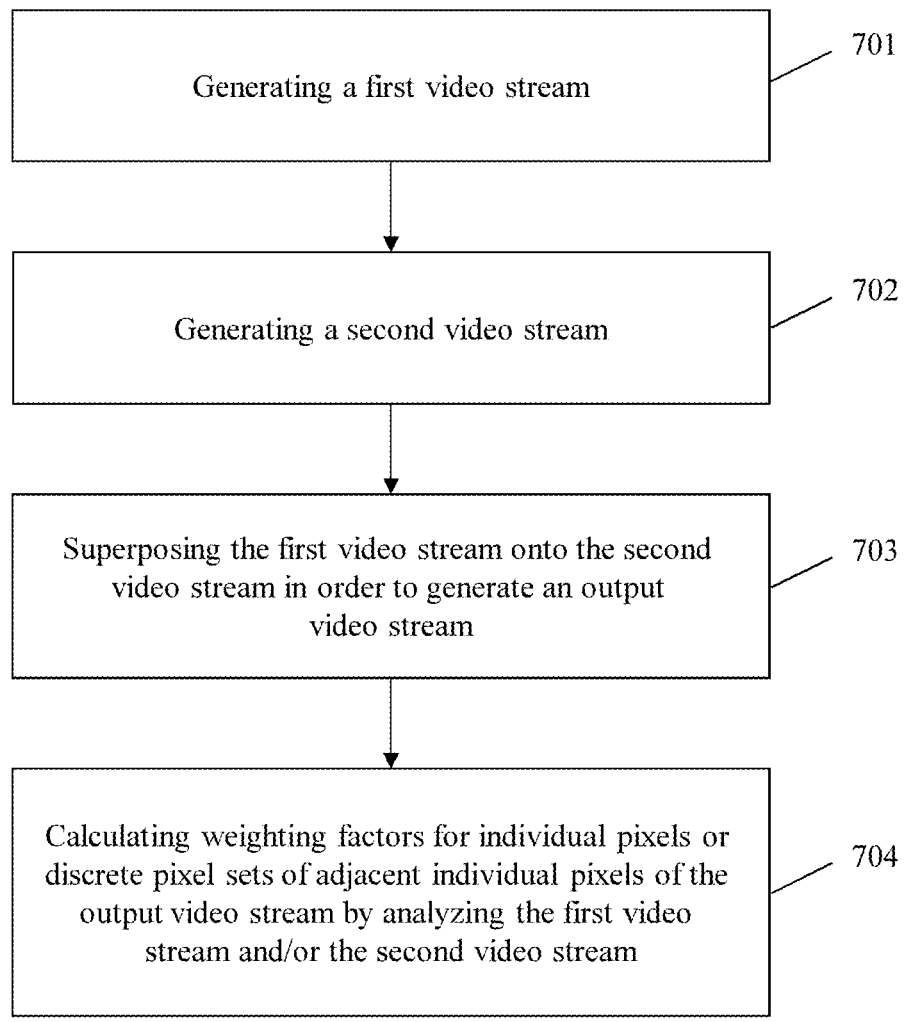
FIG. 7 shows an exemplary embodiment of the method according to the second aspect of the invention.

In FIG. 7, an exemplary embodiment of the method according to the second aspect of the invention is illustrated. In a first step 701, a first video stream is generated. In a second step 702, a second video stream is generated. In a third step 703, the first video stream is superposed onto the second video stream in order to generate an output video stream. Finally, in a fourth step 704, weighting factors for individual pixels or discrete pixel sets of adjacent individual pixels of the output video stream are calculated by analyzing the first video stream and/or the second video stream.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for facilitating an enhanced video pipeline in order to improve color perception, the system comprises:
    a first source configured to generate a first video stream,
    a second source configured to generate a second video stream, and
    a computing device,
    wherein the computing device is configured to superpose the first video stream onto the second video stream, thereby generating an output video stream, wherein the computing device is further configured to calculate weighting factors for individual pixels or discrete pixel sets of adjacent individual pixels of the output video stream by analyzing the first video stream and/or the second video stream, and wherein the computing device is further configured to estimate influence factors for individual pixels or discrete pixel sets of adjacent individual pixels of the second video stream and further configured to realize the weighting factors as a function of the influence factors.

2. The system according to claim 1,
wherein the system further comprises a memory configured to store pre-calculated color manipulation matrices.

3. The system according to claim 2,
wherein the computing device is further configured to utilize the weighting factors in order to determine a percentage of the pre-calculated color manipulation matrices.

4. The system according to claim 2,
wherein the pre-calculated color manipulation matrices correspond to XYZ color spaces according to the International Commission on Illumination "CIE".

5. The system according to claim 1,
wherein the computing device is further configured to calculate the weighting factors in real-time.

6. The system according to claim 1,
wherein the computing device is further configured to perform Gamma correction on the first video stream and/or the second video stream.

7. The system according to claim 1,
wherein the computing device is further configured to perform in-plane translational and rotational corrections on the first video stream and/or the second video stream.

8. The system according to claim 1,
wherein the computing device is further configured to perform windowing on the first video stream and/or the second video stream.

9. The system according to claim 1,
wherein the system further comprises a surface onto which the first video stream and/or the second video stream and/or the output video stream being projected, and wherein optionally the output video stream is transmitted through an optical waveguide whereby the surface is perceived through the waveguide, preferably a holographic waveguide.

10. A method for facilitating an enhanced video pipeline in order to improve color perception, the method comprises the steps of:

generating, by a first source, a first video stream,
generating, by a second source, a second video stream,
superposing, by a computing device, the first video stream onto the second video stream in order to generate an output video stream,
calculating, by the computing device, weighting factors for individual pixels or discrete pixel sets of adjacent individual pixels of the output video stream by analyzing the first video stream and/or the second video stream, and
estimating, by the computing device, influence factors for individual pixels or discrete pixel sets of adjacent individual pixels of the second video stream and further configured to realize the weighting factors as a function of the influence factors.

11. The method according to claim 10,
wherein the method further comprises the step of storing pre-calculated color manipulation matrices in a memory.

12. The method according to claim 11,
wherein the method further comprises the step of utilizing the weighting factors in order to determine a percentage of the pre-calculated color manipulation matrices.

13. The method according to claim 10,
wherein the method further comprises the step of calculating the weighting factors in real-time.

14. The method according to claim 10,
wherein the method further comprises the steps of:
storing the output video stream in an on-chip memory in order to access the output video stream at a frame rate different from the first source, and
performing a late stage re-projection function depending on an input of an external data source tracking a viewer position and/or movement and/or eye viewing angle.

* * * * *